May 11, 1965 A. M. SHEMET 3,182,770

FASTENING DEVICE

Original Filed June 13, 1960 2 Sheets-Sheet 1

Alexander M. Shemet,
*INVENTOR.*

*BY.*

W Hunt Allister Jr.

*ATTORNEY.*

May 11, 1965 A. M. SHEMET 3,182,770

FASTENING DEVICE

Original Filed June 13, 1960 2 Sheets-Sheet 2

Alexander M. Shemet,
*INVENTOR.*
*BY.*

W. H. McAllister Jr.

*ATTORNEY.*

United States Patent Office
3,182,770
Patented May 11, 1965

3,182,770
FASTENING DEVICE
Alexander M. Shemet, 3438 Empty Saddle Road, Rolling Hills Estates, Calif.
Continuation of application Ser. No. 35,585, June 13, 1960. This application Sept. 10, 1963, Ser. No. 308,032
4 Claims. (Cl. 189—36)

This is a continuation of my now abandoned application, Serial No. 35,585, filed June 13, 1960, entitled "Fastening Device."

This invention relates to a quick-release, fool-proof fastening device for panels and the like. More particularly, but not necessarily exclusively, the invention relates to a quick-release rotatable-type fastener for securing together a pair of plates, one of which may be an inspection cover plate, for example.

The general type of fastener to which the fastening device of the instant invention is related comprises a stud rotatably mounted in a plate (hereinafter called the "stud-plate") having a bar transversely mounted on one end thereof and adapted to be rotatable with the stud. The other end of the stud is adapted to be rotated by hand or by tools or the like. It may be provided with a knob or a groove for a screwdriver, for example. The plate to be secured to the stud-plate is provided with an opening so shaped and dimensioned as to permit the transverse bar on the stud to pass therethrough in one position, but permitting this transverse bar to extend over portions of the plate when the stud and transverse bar thereon are rotated to a second position (which may be 90° from the aforementioned first postion). Such an aperture may be a rectangle in shape, for example, whose long dimensions will admit the aforementioned transverse bar.

While such fasteners have great utility they are subject to several objections. In the first place the stud and its transverse bar may be freely rotated at any time yet must be in one and only one position in order to enter the aforementioned aperture in the plate to be secured. Since the transverse bar is on the "blind" side of the stud-plate, inadvertent rotation of the stud, when the plates are unfastened and separated, makes it necessary to rotate the stud and find the proper position by "feel" when it is desired to refasten the plates together. In addition, it will be appreciated that forces applied on the plates when secured together may result in movement of the plates relative to each other in planes at right angles to the stud fastener because the aforementioned aperture must be large enough, at least in one direction, to admit the transverse bar. Hence, the stud itself, while adapted to remain fixed against such movement with respect to the stud-plate, may move along in the aperture in the other plate unless special means are provided to prevent such movement. To state it otherwise, the plate may move in the direction of the principal dimension of its aperture. The aforesaid special means to prevent such movement are usually rather elaborate and expensive stops or the like which are provided in addition to the fastening device itself. Such relative movement of these plates with respect to each other is extremely undesirable in many instances, particularly, for example, where it is desired to employ such quick-fastening devices for inspection cover plates or the like in aircraft and missiles.

It is therefore an object of the instant invention to provide an improved fastening device of the rotatable stud type.

Another object of the invention is to provide an improved fastening device of the rotatable stud type for securing plates or the like together quickly and which is adapted to prevent relative movement of the plates with respect to each other when so secured.

Another object of the invention is to provide an improved fastening device of the rotatable stud type for securing plates or the like together which fastening device cannot be rotated out of proper position while the plates are unfastened or otherwise separated and which is adapted to prevent relative movement of the plates with respect to each other when fastened together by the aforesaid fastening device.

These and other objects and advantages of the invention are accomplished by providing a stud with a first rectangularly-shaped shoulder portion having curved ends which is insertable in a "key-hole"-shaped aperture in the stud plate. The stud may thus be moved in a plane normal to the axis of the keyhole and into the rectangular portion or "leg" thereof. This movement across the keyhole is hereinafter referred to as being lateral. It will thus be understood that when the stud is moved into the "leg" of the keyhole, it cannot be rotated because the rectangular shoulder portion of the stud is then contained within the walls of the rectangularly-shaped "leg." Hence it will be appreciated that in the "open" or "unfastened" position of the stud, the shoulder portion of the stud is in the "leg" of the keyhole in the stud plate, thus preventing the stud from being inadvertently rotated out of position. The plate to be fastened to the stud-plate is also provided with a similar "keyhole" aperture. The stud is likewise provided with a second rectangularly-shaped shoulder portion (again having curved ends). This second shoulder portion is positioned on the stud so as to be contained within the walls of the "keyhole" aperture in the second plate when the two plates are brought together. In the "unfastened" position of the stud, the second shoulder portion is similarly positioned within the "leg" of the larger keyhole in the second plate. Finally the end of the stud protruding through the aperture in the second plate is provided with a third shoulder portion, which is hereinafter called a transverse bar, having a length greater than the diameter of the circular portion of the keyhole. To fasten the two plates together, the stud is moved in a direction perpendicular to the axis of the keyhole apertures so as to be coaxial with the center of the circular portions of the two keyhole apertures. This movement also moves one end of the transverse bar over the plate to be secured. The stud may then be rotated 90° which results in turning the transverse bar so that its second end passes over the second plate around the circular portion of the keyhole aperture in the second plate. Due to the fact that both the first and second shoulder portions have lengths corresponding respectively to the internal diameters of the circular portions of the keyhole apertures in the respective plates, the plates cannot be moved in planes at right angles thereto because the walls in each plate defining the keyhole apertures abut these shoulder portions. The stud may be freely rotated as desired in the circular portions of the keyhole apertures because the ends of the shoulder portions have a curvature substantially equal to the curvature of the aforementioned circular portions.

The invention will be described in greater detail by reference to the drawings in which.

Figure 15:
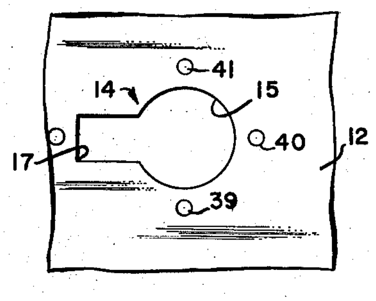
Figure 16:
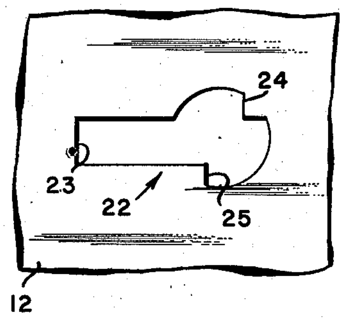
Figure 13:
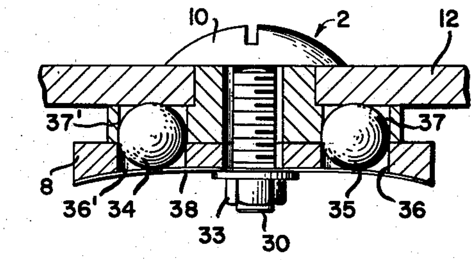
Figure 14:
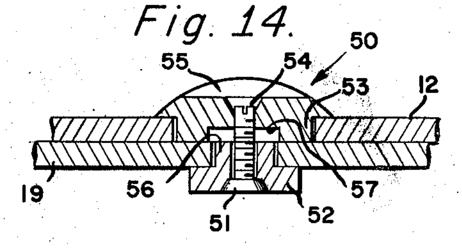
Figure 17B:
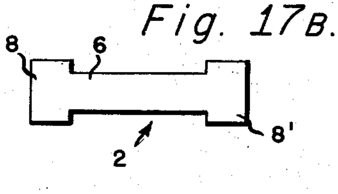
Figure 17A:
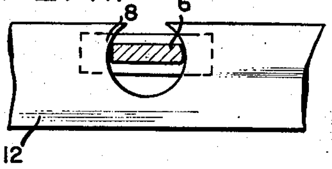

FIGURE 13 is an elevational view in section of the stud-fastening device showing the first and second shoulder portions thereof, the transverse bar on the end of the stud, alternate means for securing these components to the stud so as to be rotatable therewith when the stud is turned by the screwhead thereof, and having means to provide positive indications and retention against inadvertent rotation thereof;

FIGURE 14 is an elevational view in section of the stud-fastening device and the plates to be secured thereby having means to tighten the stud and the plates in the "lock" position when employed as a semi-permanent blind fastening device;

FIGURE 15 is a plan view of the stud plate showing the aperture therein with detents or depressed portions positioned therearound;

FIGURE 16 is a plan view of the stud plate provided with a modified circular aperture to provide positive stop for the stud when rotated 90° in either direction; and FIGURE 17*a* and 17*b* are respectively elevational views of the stud-fastening device having two transverse bar portions and one shoulder portion for use with only one plate, FIGURE 17*b* being a view of the stud itself at right angles to the view shown in FIGURE 17*a*.

Figures 1, 2, 3, 4, 5, 6, 7, 8, 9:
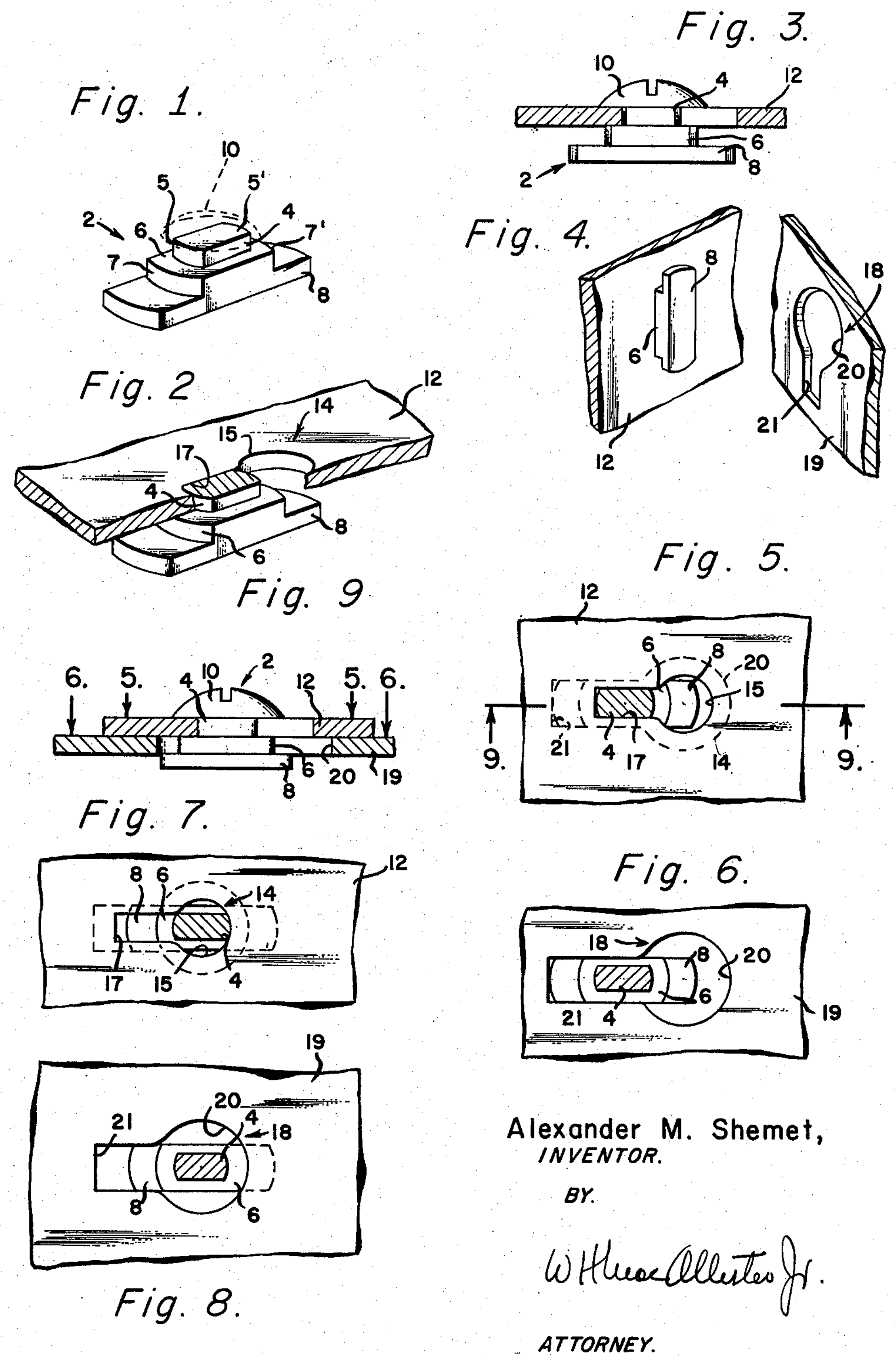
FIGURE 1 is a perspective view of the stud-fastening device according to the invention.
FIGURE 2 is a perspective view, partly in section, of the stud-fastening device and the stud plate according to the invention.
FIGURE 3 is an elevational view, partly in section, of the stud-fastening device and the stud plate according to the invention.
FIGURE 4 is a perspective view of the stud plate, and a second plate to be fastened to the stud plate.
FIGURE 5 is a plan view of the stud-fastening device and the stud plate, showing the first shoulder-portion of the stud in the "leg" of the keyhole aperture in the stud plate.
FIGURE 6 is a plan view of the stud-fastening device and the plate to be secured thereby showing the second shoulder-portion of the stud in the "leg" of the keyhole aperture in the plate and the transverse bar on the end of the stud.
FIGURE 7 is a plan view of the stud-fastening device and the stud plate, showing the first shoulder-portion of the stud in the circular portion of the keyhole aperture in the stud plate.
FIGURE 8 is a plan view of the stud-fastening device and the plate to be secured thereby, showing the second shoulder-portion of the stud in the circular portion of the keyhole aperture in the plate and the transverse bar on the end of the stud extending over the portions of the plate surrounding the keyhole aperture before rotation of the stud to the full "fasten" position.
FIGURE 9 is an elevational view in section showing the stud plate, the plate to be secured thereto, the stud, the shoulder portions of the stud, and the transverse bar on the end of the stud which is in the open position before lateral movement of the stud to the center of the circular portions of the apertures in the two plates.

Referring now specifically to FIGURE 1, the stud 2 of the present invention is provided with first and second shoulder portions 4 and 6, and with a bar 8 mounted transversely on the end thereof. In order to more clearly show the shoulder portions or stages 4 and 6, the means for turning the stud 2 about its long axis, such as a knob or screwhead, have not been shown in this figure. However, it is to be understood that such means are contemplated and may be provided as more clearly shown in FIGURE 3 wherein the stud 2 is provided with a transverse shoulder portion or a screwhead 10. The shoulder portions 4 and 6 are substantially rectangular in shape with the ends 5, 5′ and 7, 7′ on the short sides thereof being curved for a purpose to be explained more fully hereinafter. The dimensions and radii of curvature of these shoulder portions can be more clearly and easily demonstrated by reference to the apertures in the two plates which are to be secured together by the stud-fastening device of the invention. Hence, with reference to FIGURE 2, the stud plate 12 (so-called herein because the stud 2 is mounted thereon as will be more fully shown hereinafter) is provided with an aperture 14 therein whose general shape is that of a keyhole. The shape of the aperture 14 may be more technically defined as a circle having a rectangle extending from a portion thereof. Such a shaped aperture is identified hereinafter as a "keyhole" aperture.

As mentioned previously, the first shoulder portion 4 of the stud 2 is rectangularly shaped; the width of this shoulder or stage is substantially equal to the width of the rectangular portion 17 of the keyhole aperture 14 in the stud plate 12. The curved ends 5, 5′ of the shoulder 4 have a radius of curvature substantially equal to the radius of the circular portion 15 of the keyhole aperture 14. Thus the length of the stage 4 between the curved ends 5, 5′ may be regarded as substantially equal to the diameter of this circular portion 15 of the aperture 14. It should be understood that as used herein and throughout the specifications and claims hereof, the term "substantially equal" is intended to indicate a close fit or tolerance but at the same time one which still permits movement without sloppiness.

The second stage or shoulder portion 6 of the stud 2 is likewise rectangularly shaped and provided with curved ends 7, 7′. The dimensions of this stage 6 are similarly related to the dimensions of the keyhole aperture 18 in the plate 19 which is also provided wiht a rectangular leg 21 and a circular portion 20 as shown in FIGURE 4. The second shoulder portion 6, however, may be longer and wider than the first shoulder portion 4 in order to permit the stud 2 to be secured to the stud plate 12 without being movable along the axis of the stud with respect to the stud plate 12. Hence the dimensions of the keyhole aperture 18 are correspondingly larger than those of the keyhole aperture 14 in the stud plate 12. With reference to FIGURES 2 and 3, it will be noted how the stud plate 12 is secured between the second shoulder portion 6 and the screwhead 10. If the screwhead 10 is integral with the stud 2, securing the stud to the stud plate 12 may be accomplished by making the screwhead 10 initially of a diameter small enough to permit its passage through the keyhole aperture 14 in the stud plate 12. Thereafter a larger diameter may be imparted to the screwhead 10 as by peening. If the second stage 6 were of the same size as the first stage 4, the second stage 6 could, of course, enter the keyhole aperture 14 in the stud plate 12 just as the first stage 4 does. While the stud 2 would still be retained in the stud plate 12 by the screw head 10 on one side and the transverse bar 8 on the other, and hence could still be operative as far as the invention is concerned, the axial looseness or freedom in a direction normal to the plate 12 of the stud 2 in the full "open" position is objectionable. In the "locked" or full "fasten" position this axial freedom of the stud 2 would be avoided since the two plates 12 and 19 would be secured together so as to take up any axial "slop" along the axis of the stud 2. Hence, it will be understood that the embodiment wherein the second stage 6 is provided with greater dimensions than the first stage 4 is preferred but it does not represent a structurally necessary arrangement in order to practice the invention successfully to advantage.

The final stage of the stud 2 comprises a bar-like member or third shoulder portion 8 which is secured to the end of the stud 2 and at right angles with respect thereto. The bar 8 may also be rectangular in shape and its longest dimension is greater than the diameter of the large keyhole aperture 18 in the plate 19 so that when the stud plate 12 and the plate 19 are brought together in such a fashion as to make the centers of the keyhole apertures in the plates coaxial and the stud is moved from the legs of the keyholes so that its axis is likewise at the coaxial centers of the apertures, one end of the bar 8 will extend over the plate 19 to be secured thereby. Rotation of the stud 2 will cause the other end of the bar 8 to move from its position over the legs of the apertures so as to extend over portions of the plate 19 opposite to those portions engaged under the other end of the bar. The maximum length of the bar 8 thus may be the length of the leg in the keyhole aperture 18 plus the distance to the opposite portion of the circular portion 20. If this maximum is exceeded then it will not be possible to pass the bar 8 through the keyhole aperture 18. The width of the bar is substantially equal to the width of the rectangular portion or leg of the keyhole aperture 18. While not absolutely necessary for operation according to the invention, at least one end of the bar 8 is curved, the radius of curvature thereof being substantially equal to the radius of the circular portion of the keyhole aperture 18. It will be appreciated that such a curved end will be necessary if it is desired to provide a bar of maximum length (a length equal to the diameter of the circular portion of the keyhole aperture plus the length of the leg portion). Having both ends of the bar 8 curved is more desirable since if only one end of the bar 8 were curved, only this end must be over the circular portion of the keyhole aperture when it is desired to unfasten the plates. Hence to avoid such a position limitation it is more convenient to curve both ends of the bar identically.

The final dimension of the various stages or shoulder portions of the stud member to be considered is the height thereof. This is dictated by the thickness of the plates to be secured together. Thus, the first stage or shoulder portion 4 has a height at least substantially equal to the thickness of the stud plate 12; the second stage 6 likewise has a height substantially equal to the thickness of the plate 19 to be secured to the stud plate 12. The height of the bar 8 is not significant except for consideration of the desired mechanical strength thereof and of course any necessary clearances with respect to other apparatus or the like which may be disposed on the side of the plate 19 on which bar 8 is to be rotated.

Figure 11:
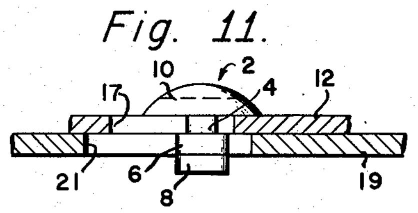
FIGURE 11 is an elevational view in section showing the stud plate, the plate to be secured thereto, the stud, the shoulder portions of the stud and the transverse bar on the end of the stud after rotation of the stud to the full "fasten" position.
Figure 10:
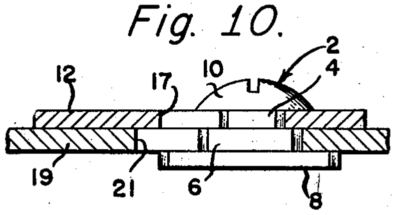
FIGURE 10 is an elevational view in section showing the stud plate, the plate to be secured thereto, the stud, the shoulder portions of the stud and the transverse bar on the end of the stud after lateral movement thereof to the center of the circular portions of the aperture in the two plates and before rotation of the stud to the full "fasten" position.

In operation the stud 2 is mounted on the stud plate 12 as described heretofore and shown in FIGURES 3, 4 and 5. In this, the "open" position of the stud 2 and the stud plate 12 as shown in FIGURE 5, inadvertent rotation of the stud is prevented since the first shoulder portion 4 thereof is disposed within the rectangular leg 17 of the aperture 14. The bar 8 is likewise thereby disposed in a direction corresponding to the longest dimension of the keyhole aperture 18 in the plate 19 which is to be secured to the stud plate 12. The plates are then brought together by movement of either or both whereby the bar 8 passes through the aperture 18 in the plate 19 and the second shoulder portion 6 of the stud enters the rectangular leg portion 21 of the aperture 18. The relationship of the plates, the aperture therein, and the stud 2 at this step is shown in FIGURES 5, 6 and 9. The stud is then moved in a plane perpendicular to the axis of the apertures so as to slide the rectangular shoulder portions 4 and 6 out of the respective rectangular leg portions 17 and 21 and into the respective circular portions 15 and 20 of the two plates 12 and 19. The disposition of the first shoulder portion 4 in the circular portion 15 of the aperture 14 in the stud 12 after this lateral movement is shown in FIGURE 7. The disposition of the second shoulder portion 6 and the transverse bar 8 with respect to the keyhole aperture 18 in the plate 19 after this lateral movement is shown in FIGURE 8. Another view, in elevation of the stud 2 and the plates 12 and 19 in this position is also shown in FIGURE 10 where it will be noticed that the lateral movement of the stud into this position immediately locks the plates together since such movement causes the bar 8 to ride over a portion of the plate 19 surrounding the circular aperture therein. Hence, this position may be referred to as the "half-open" or "half-fasten" position of the stud. The final operation needed to complete the locking of the two plates is rotation of the stud 2 which moves the "free" end of the bar 8 from over the open rectangular leg 17 of the aperture 18 to a position over portions in the plate 19 likewise surrounding the circular portions 20 of this aperture. The rotation needed to accomplish this final locking action is a quarter-turn of the stud and the final "lock" position of the stud is shown in FIGURE 11.

It will thus be appreciated that in the "open" position the stud cannot be inadvertently rotated unless it first is moved laterally out of the rectangular leg of the aperture 14 in the stud-plate 12. Hence the stud always remains in the proper position for engagement with the aperture in the second plate unless deliberately moved. In the "full fasten" position neither the stud nor either plate may be moved in any direction parallel to the plane of the two plates because of the engagement of the curved ends of the shoulder portions 4 and 6 with the circular-portions 15 and 20 respectively of the aperture in each plate.

Figure 12:
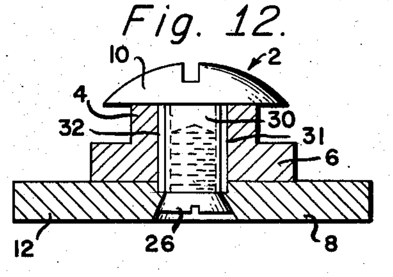
FIGURE 12 is an elevational view in section of the stud-fastening device showing the first and second shoulder portions thereof, the transverse bar on the end of the stud, and means for securing these components to the stud so as to be rotatable therewith when the stud is turned by the screwhead thereof.

The stud 2 may be machined from a single piece of stock metal. A less difficult and more economical arrangement of the stud and its parts is shown in FIGURE 12 wherein the stud 2 comprises a hollow shaft 30 having a screw head 10 integral therewith. The internal portion of the shaft 30 is threaded. A pair of wings 31 and 32, extending along the length and on opposed sides of the shaft, are provided. The shoulder portions 4 and 6 may be an integral unit or they may be separate items. Each of these stages 4 and 6 are provided with a central circular hole therein, each hole being additionally provided with opposed grooves so as to permit each stage to be slipped over the shaft 30 of the stud with the wings 31 and 32 riding in the grooves so that rotation of the shoulder portions or stages is positively obtained and assured when the stud itself is rotated. The transverse bar 8 is likewise provided with a central aperture having a countersunk portion and opposed grooves. The bar 8 is likewise slipped onto the shaft 30 so that its grooves also are engaged by the wings 31 and 32 of the shaft. The entire assembly is then securely held together with an externally threaded screw 26 which is threaded into the hollow portion of the shaft 30 until its head is contained with the countersunk portion of the aperture in the transverse bar 8 so as to be flush therewith.

Alternatively, the hollow shaft embodiment shown in FIGURE 12 may be replaced with a solid shaft which is externally threaded whereby the parts may be bolted together by means of nut 33 on the shaft 30 as shown in FIGURE 13. Also shown in this embodiment is an arrangement whereby a small pair of balls 34 and 35 are each disposed within circular apertures 36, 36' and 37, 37', provided through the transverse bar 8 and the second shoulder portion 6, respectively. The balls 34 and 35 are held into contact with the stud plate 12 as shown and are maintained in place within the apertures 36, 36' and 37, 37' and against the stud plate 12 under pressure by means of a leaf-type spring 38 which is bolted against the outside of the transverse bar 8 by the nut 33. The stud plate 12 is provided with small circular detents 29, 40, and 41 as shown in FIGURE 15, which are positioned 90° apart around the circular portion 15. A fourth detent may be disposed opposite the end of the rectangular leg 17 of the keyhole aperture 14 if desired. It will be appreciated that by this arrangement 90° rotation of the stud 2 will bring the balls 34 and 35 into the opposed detents 39 and 41. In operation the movement of these balls into these detents is accompanied by an audible snap or click thus assuring the operator that the stud 2 has been turned to the proper "fasten" position. This detent ball arrangement also tends to further offer resistance to inadvertent rotation of the stud as might be caused by vibration or the like. Rotating the stud 90° from the "fasten" position to the "half-open" position (the position of the stud prior to lateral movement thereof into the legs of the apertures) will cause one of the balls to ride into the detent 40, again producing an audible click and thus indicating proper position for laterally moving the stud 2 into the legs of the apertures in the two plates. Such lateral movement, in turn, results in moving the ball out of the deent 40. The opposite ball will at the same time be moved into the fourth detent which may be provided adjacent the end of the leg 17 in the stud plate 12, again being accompanied with an audible, position-signalling click. This fourth detent is primarily desirable only to produce the signalling click since the stud cannot be rotated in this full "open" position anyway. The fourth detent may also tend to offer resistance to inadvertent lateral movement of the stud.

In FIGURE 16 another keyhole aperture arrangement 22 is shown which results in positive stopping of the stud 2 when rotated into either the full "fasten" or "half-open" positions. In this embodiment, only alternate quarter portions of the keyhole aperture are circular, one of the intervening non-circular quarter portions being constituted by a remaining solid portion 24 of the plate itself. The other intervening solid quarter portion is constituted by the solid portion 25 of the plate and by the open leg 23 of the aperture. It will be appreciated that as far as lateral movement of the stud into and out of the leg portion is concerned, the operation is the same as if the blocked circular portion were completely circular as in prior embodiments. When the stud is disposed in the "half-open" position (that is, when the stud is out of the leg portion) and rotated 90°, the shoulder portion of the stud will be brought into abutment with the solid portions 24 and 25 of the partially circular portion of the aperture 22 in the plate, thus positively stopping the stud from further rotation and assuring the attainment of proper position for either locking or for lateral movement of the stud. Hence, the stud may be rotated only a quarter-turn in one direction to move it to the full "fasten" position, while a quarter-turn into the opposite direction moves it into the "half-open" position, more than 90° rotation of the stud in a given direction being prevented altogether.

While the modified keyhole aperture arrangement shown in FIGURE 16 may be provided in either or both of the plates 12 and 19, a particular advantage of providing such an aperture only in the plate 19 to be secured to the stud plate may be realized as follows. If, in assembling the two plates 12 and 19 together, the stud 2 for some reason does not properly enter the aperture in the plate 19 which is to be secured to the stud plate 12, the stud may be continuously rotated 360° or more thus indicating improper or no engagement. When proper engagement is attained, the stud can only be rotated 90° and thus a positive assurance of engagement is provided.

Referring now to FIGURE 14, another embodiment of the stud-fastening device is shown which is especially useful where it is desired to employ the stud fastener of the instant invention as a semi-permanent "blind" fastening device. By "semi-permanent" is meant a fastener which may be removed but which is primarily designed to remain in place for rather extended periods of time while providing the fastening strength of a rivet or the like but not having its immobility. In this embodiment, the larger shoulder portion 53 of the stud 50 is provided adjacent the screwhead 55 and may be integral therewith. An internally threaded bore terminating in a tapered hole at the screwhead end of the stud is also provided. This arrangement is the reverse of that shown in FIGURE 12, for example, in that the larger shoulder portion 53 is provided on the stud 50 so as to be nearer the working side rather than nearer the blind or non-accessible side of the plate 12. The smaller shoulder portion 56 is provided adjacent the larger shoulder portion 53 and may be integral with the transverse bar portion 52. Both the bar 52 and the smaller shoulder 56 are provided with a central bore therethrough, the bore terminating in a tapered hole in the bar 52. The shoulder portion 53 and 56 (and hence the screwhead portion 55 and the bar portion 52) are secured together by a screw 51 which is inserted into the bores through these portions from the transverse bar end of the assembly. The apertures in the plates 12 and 19 may be of the keyhole configuration shown and described hereinbefore although it will be appreciated that the stud 50 in the instant embodiment will not be permanently secured to the plate 12 as before. This is because the reversal of the larger and smaller shoulder portions on the stud and the necessity of providing the plate 12 with the larger of the two apertures does not permit the plate 12 to be contained between the screwhead portion 55 and the larger shoulder portion 53.

In operation, the stud assembly 50 is inserted into the plates 12 and 19 through the keyhole apertures therein with the shoulder portions 53 and 56 passing through the leg portions of the apertures. The stud assembly is then laterally moved out of the legs of the apertures into the circular portions thereof and thus into the aforementioned "half-fasten" position. Upon 90° rotation of the entire stud assembly, achieved by means of the screwhead 55, the transverse bar portion 52 is brought into full engagement with the plate 19 which is thereby secured to the plate 12 as described hereinbefore. The assembly is then tightened together along the direction of the stud axis by means of the screw 51 which passes through the entire assembly and is provided with a slot 54 on the terminal end thereof which protrudes into the tapered hole in the screwhead 55. A slight clearance may be provided between the inner end of the small shoulder portion 56 and the inner surface of the larger shoulder portion 53 as shown by the space 57 which, in the drawing, is somewhat exaggerated for convenience of illustration. Such clearance may be desirable in order to permit compensation for variations in plate thicknesses which may occur. The space 57 may be provided by a recess in the inner end of the larger shoulder portion 53, the dimensions of the recess corresponding substantially to those of the smaller shoulder portion 56.

There thus has been described a novel and useful rotatable stud-type fastening device for plate-like panels or objects having surfaces capable of being provided with apertures. The stud-type fastener of the present invention prevents relative movement of the plates or objects to be joined thereby with respect to each other and the fastener itself cannot be inadvertently rotated when the plates are not fastened together thereby. In addition, embodiments of the invention have been described which provide for positive identification of the various positions of the stud and for preventing undesirable lateral movement or rotation of the stud when in the full "fasten" or full "open" positions of the fastener. It should also be appreciated that the advantages of the invention may be attained when practicing the invention with respect to only one plate or object and the stud itself is to serve some additional function or purpose. This latter embodiment is briefly illustrated in FIGURES 17*a* and 17*b*. Thus one of the shoulder portions may be dispensed with, the remaining one 6, riding in the keyhole aperture, the stud being prevented from moving in one direction by the shoulder portion 6 being in engagement with the circular portion of the aperture and in a direction at right angles thereto by transverse bars 8, 8′ on each end thereof. In such possible usage of the invention, it should be realized that the outward end of the stud or one of the transverse bars may be provided with a hook or bracket or the like. Furthermore, a portion of the keyhole aperture in such an embodiment may be constituted by space other than that defined by the plate or object. Thus the aperture may be provided near the edge of a plate with the circular portion being defined by the plate while the leg portion is provided by having the circular portion at the edge of the plate so as to have an open portion thereat.

What is claimed is:

1. A fastening device comprising, in combination, a stud having a plurality of adjacent shoulder portions disposed along the axis thereof, a first plate having an aperture therein of which a first portion is circular and a second portion is rectangular, one of said shoulder portions having a pair of straight sides and a pair of curved sides contained in said aperture in said first plate, a second plate having an aperture therein of which a first portion is circular and a second portion is rectangular, a second of said shoulder portions having a pair of straight sides and a pair of curved sides contained in said aperture in said second plate, means on the ends of said stud to prevent axial movement thereof through said apertures in said plates when said stud is in a first position with said shoulder portions in said circular portions of said apertures, at least one of said end means on said stud being axially movable through the aperture in one of said plates when said stud is moved in a plane normal to the axis of said apertures and into a second position where said shoulder portions are in said rectangular portions of said apertures.

2. A fastening device for a pair of apertured plates one of which has depressed portions disposed about the aperture therein, comprising a stud having a plurality of shoulder portions disposed along the axis thereof, at least two of said shoulder portions having a rectangular shape corresponding to the shape of different portions of the apertures in said plates with one of said two shoulder portions being longer than the other, said stud being adapted for movement in said apertures in a plane normal to the axis of said apertures from a portion thereof of one shape which prevents rotation of said stud therein to a portion of a different shape which permits rotation of said stud to thereby move a third shoulder portion of said stud into a position which prevents axial movement of said stud through the aperture in one of said plates, and means associated with said shoulder portions for engagement with said depressed portions disposed about the aperture in said one plate to hold said stud in either of said differently-shaped portions of said apertures.

3. The invention according to claim 2 wherein said means associated with said shoulder portions comprises ball and spring means.

4. A fastening device comprising, in combination, a stud having a plurality of adjacent rectangularly-shaped shoulder portions of different lengths disposed along the axis thereof, a first object to be fastened having a keyhole-shaped aperture therein with one of said shoulder portions being contained in said aperture, a second object to be fastened to said first object and having a keyhole-shaped aperture therein with a second shoulder portion of said stud being contained in said aperture, said keyhole-shaped aperture in said first object having opposed circular and non-circular sectors, means on the ends of said stud to prevent axial movement thereof through said apertures in said objects in a first position of said stud in said apertures, said apertures besing adapted to permit movement of said stud in a plane normal to the axis of said apertures from said first position to a second position whereby at least one of said end means on said stud can be axially moved through the aperture in one of said objects.

References Cited by the Examiner

UNITED STATES PATENTS

| | | | |
|---|---|---|---|
| 1,772,835 | 8/30 | Jurad | 85—5 |
| 2,445,009 | 7/48 | Strauss et al. | 174—45 |

RICHARD W. COOKE, Jr., *Primary Examiner.*

JACOB L. NACKENOFF, *Examiner.*